United States Patent [19]

Owechko

[11] Patent Number: 5,845,241
[45] Date of Patent: Dec. 1, 1998

[54] HIGH-ACCURACY, LOW-DISTORTION TIME-FREQUENCY ANALYSIS OF SIGNALS USING ROTATED-WINDOW SPECTROGRAMS

[75] Inventor: Yuri Owechko, Newbury Park, Calif.

[73] Assignee: Hughes Electronics Corporation, El Segundo, Calif.

[21] Appl. No.: 707,540

[22] Filed: Sep. 4, 1996

[51] Int. Cl.$^6$ ..................................................... G10L 3/02
[52] U.S. Cl. ........................... 704/203; 704/205; 704/251
[58] Field of Search ..................... 704/215, 200, 704/205, 268, 276, 251, 203, 231, 229, 230

[56] References Cited

U.S. PATENT DOCUMENTS

| | | | |
|---|---|---|---|
| 3,634,759 | 1/1972 | Koshikawa et al. | 704/276 |
| 3,689,696 | 9/1972 | Inoue | 704/268 |
| 4,015,087 | 3/1977 | Stewart | 704/205 |
| 4,471,445 | 9/1984 | Pernick | 364/485 |
| 4,640,134 | 2/1987 | Simmons | 73/648 |
| 4,894,795 | 1/1990 | Whitehouse et al. | 364/807 |
| 5,353,233 | 10/1994 | Oian et al. | 364/485 |
| 5,373,460 | 12/1994 | Marks, II | 364/724.011 |
| 5,412,589 | 5/1995 | Williams et al. | 364/728.06 |

OTHER PUBLICATIONS

Signal Modeling Techniques in Speech Recognition, Joseph W. Picone, Proceedings of the IEEE, vol. 81, No. 9, Sep. 1993, pp. 1215–1247.
Continuous Speech Recognition, Nelson Morgan and Herve Bourlard, IEEE Signal Processing Magazine, May 1995, pp. 25–42.
Relationships between the Radon–Wigner and fractional Fourier transforms, Adolf W. Lohmann, Bernard H. Soffer, Journal of the Optical Society of America A, vol. 11, No. 6, Jun. 1994, pp. 1798–1801.
The Fractional Fourier Transform and Time–Frequency Representations, Luis B. Almeida, IEEE Transactions on Signal Processing, vol. 42, No. 11, Nov. 1994, pp. 3084–3091.
Appln. of Positive Time–Freq Distributions to Speech Processing, James W. Pitton, Les E. Atlas and P.J. Loughlin, IEEE Transactions on Speech and Audio Processing, vol. 2, No. 4, Oct. 1994, pp. 554–566.

Primary Examiner—Richemond Dorvil
Attorney, Agent, or Firm—V. D. Duraiswamy; W. K. Denson-Low

[57] ABSTRACT

A speech processing and analysis apparatus and method for generating a time-frequency distribution of a speech signal combines a set of spectrograms with varying window lengths and orientations to provide a parameter-less time-frequency distribution having good joint time and frequency resolution at all angular orientations. The analysis window of a spectrogram is rotated relative to the frequency components of the signal by preprocessing using a Fractional Fourier Transform to form rotated window spectrograms. In particular, to form the rotated window spectrogram, the signal is initially pre-processed using a Fractional Fourier Transform of angle α, the spectrogram time-frequency distribution of the pre-processed signal is then computed using analysis window h(t) and then rotated by angle −α. The geometric mean of a set of rotated window spectrograms, which are indexed by both the analysis window length and the angular orientation of the window relative to the signal's time-frequency features, is then computed to form a combination of rotated window spectrograms.

30 Claims, 6 Drawing Sheets

HIGH-ACCURACY, LOW-DISTORTION TIME-FREQUENCY ANALYSIS OF SIGNALS USING ROTATED-WINDOW SPECTROGRAMS

BACKGROUND OF THE INVENTION

1. Field of the Invention

The present invention relates generally to speech and signal processing techniques, and more particularly to time-frequency analysis of signals.

2. Description of the Related Art

It has long been desirable to provide a high-accuracy, low-distortion method for mapping a signal's time-frequency distribution. A time-frequency distribution is a two-dimensional function of frequency and time which describes the frequency components of a temporal signal as a function of time. Accurate representation of the time-frequency distribution of a signal is important in many signal processing applications, particularly those such as speech recognition, speaker verification, rotating machinery diagnostics, sonar and radar processing, where the need to monitor the frequency components of a signal, particularly a non-stationary signal, with respect to time is critical.

Current methods for obtaining joint time-frequency distributions include the spectrogram, widely used to estimate the time-frequency energy density of signals. In particular, the spectrogram is a two-dimensional function of time and frequency given by the magnitude-squared of the sliding-window Fourier Transform of the signal s(t). The Fourier Transform transfers a time domain signal into the frequency domain. The spectrogram is computed in accordance with Eq. (1) as follows:

$$SPEC_s(t,f) = \left| \int_{-\infty}^{\infty} h(u-t)s(u)e^{-j2\pi f u} du \right|^2 \quad (1)$$

where
- s=signal
- t=time
- f=frequency
- u=time integration variable
- h(t)=window function The result is a display of the frequency content of the signal as a function of time. The frequency and time resolution of the spectrogram is determined by the length and shape of the sliding-window h(t).

Although the spectrogram includes desirable properties such as positivity and the lack of spurious interference or distorting artifacts, it nonetheless suffers from numerous shortcomings, most notably poor marginal joint time-frequency resolution. In particular, the desired time and frequency marginals are not satisfied. The term marginal is obtained from probability theory to indicate an individual distribution such as time or frequency. The marginals are derived from the joint distribution by integration over frequency or time. As a result of the time and frequency marginals not being equal, temporal (e.g., duration) and spectral (e.g., bandwidth) measurements made from the spectrogram are inaccurate.

Figure 1A:
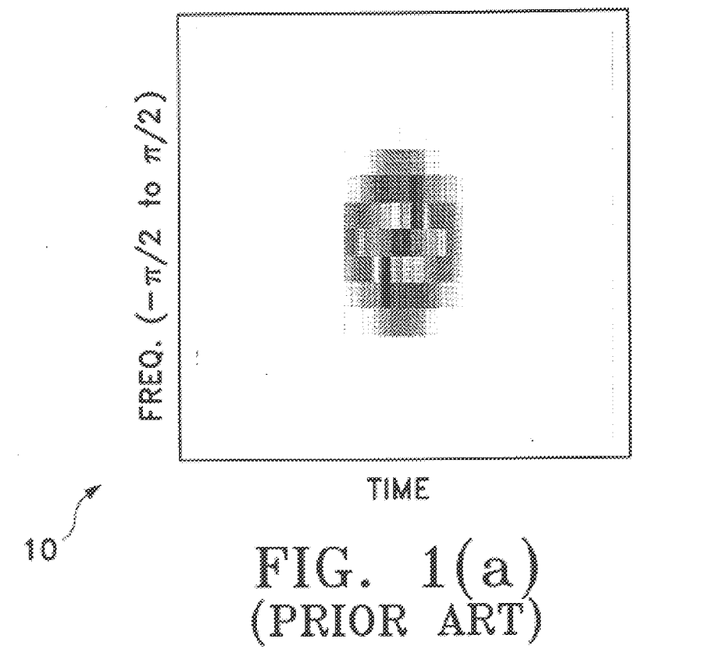
FIG. 1(a) is a graphical representation of a time-frequency distribution of an artificial test signal, where the representation is generated by a short window spectrogram.

Additionally, the sliding window technique used to generate a spectrogram forces a trade-off between time and frequency resolution in the spectrogram. Although a short window will generally yield good time resolution, the frequency resolution will be degraded as a consequence. For example, referring to FIG. 1(a), a short (64-point sampling) window spectrogram 10 of an artificial test signal consisting of a short linear chirp and two 512-point complex exponential components whose center frequencies trace an approximately circular path in the time-frequency plane is shown. An accurate time-frequency distribution should consist of a short sloping line segment (the linear chirp) surrounded by two circular arcs (the two exponential components). However, as shown in FIG. 1(a), the frequency resolution (where the horizontal axis is time, the vertical axis is frequency, with a frequency range of [−v/2, v/2] where v is the Nyquist rate) generated by the short-window spectrogram is very coarse.

Figure 1B:
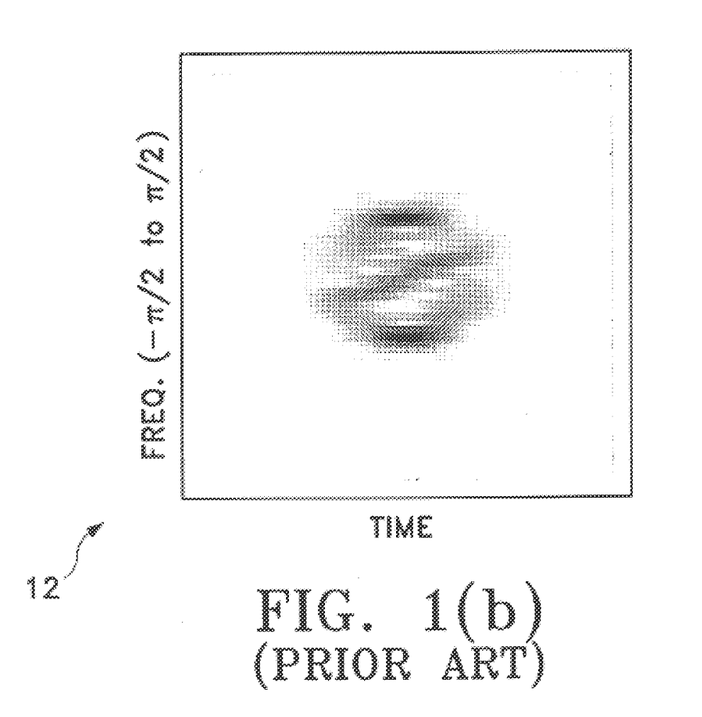
FIG. 1(b) is a graphical representation of a time-frequency distribution of the artificial test signal, where the representation is generated by a long window spectrogram.

Similarly, although a long window will generally yield good frequency resolution, the time resolution will be degraded as a consequence. For example, referring to FIG. 1(b), a long (256-point sampling) window spectrogram 12 of the same artificial test signal as in FIG. 1(a) is shown. As shown in FIG. 1(b), the time-frequency distribution generated by the long-window spectrogram is blurred along the time dimension.

Good time and frequency resolution thus cannot be achieved simultaneously with the conventional spectrogram, particularly with respect to non-stationary signals such as chirps and signals where the energy content of the signals varies such that the signal cannot be considered stationary for practically any window length. Even if the window length is made sufficiently short enough to capture rapid changes in the signal, frequency components which are close in frequency during the short window duration are difficult to resolve. The spectrogram's window length is thus an adjustable parameter which greatly affects the spectrogram's properties. The value of the window length must be selected and optimized based on a numerous factors, including prior experience, the nature of the signal, and the particular application. Consequently, all spectrograms exhibit some bias towards particular signal features and signal classes.

Figure 1C:
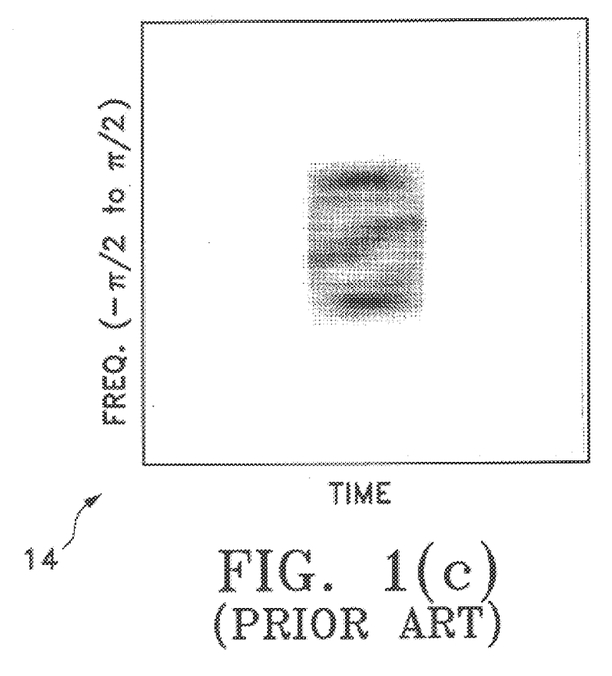
FIG. 1(c) is a graphical representation of a time-frequency distribution of the artificial test signal, where the representation is generated by a geometric mean of spectrograms of varying lengths.

The inadequacies of the spectrogram can be resolved somewhat by computing multiple spectrograms of the same signal, each with a different window length, and combining them into a single estimate of the time-frequency distribution. In particular, by computing the geometric mean of multiple conventional spectrograms having different window lengths, the cross-entropy between the combined time-frequency distribution and the individual spectrograms is minimized. However, combining conventional spectrograms in this manner still results in a time-frequency distribution whose joint time-frequency resolution is different for different signals. The geometric mean of conventional spectrograms ideally resolves tones and pulses because their time and frequency components lie along the 0 and $\pi/2$ directions in a time-frequency plane, which matches the orientation of the analysis window in the conventional spectrogram. However, other signals, particularly non-stationary signals such as chirps, are not well-resolved. For example, referring to FIG. 1(c), the time-frequency distribution 14 generated by the geometric mean of 124 conventional spectrograms with window lengths ranging from 8 to 256 of the same artificial test signal used in FIGS. 1(a) and 1(b) is shown. As shown in FIG. 1(c), although the resolution along the conventional marginal directions (0 and $\pi/2$) is good, resolution along other angles is poor and the overall time-frequency distribution is blurred.

Another conventional method for mapping the time-frequency distribution of a signal s is the Wigner Distribution, computed in accordance with Eq. (2) as follows:

$$WD_s(t,f) = \int_T s(t + T/2)s''(t - T/2)e^{-j2\pi fT} dT \quad (2)$$

The Wigner Distribution generally produces a better joint time-frequency resolution, particularly for non-stationary signals, than the spectrogram and unlike the spectrogram, satisfies the desired time and frequency marginals. Thus, if the Wigner Distribution is integrated over all frequencies, the magnitude-squared of the signal is obtained. Similarly, if the Wigner Distribution is integrated over time, the power-spectrum of the signal results.

Figure 1D:
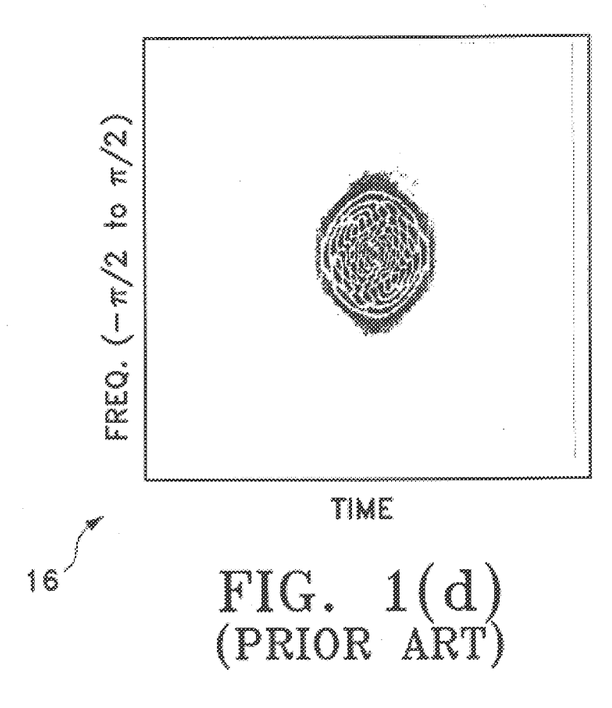
FIG. 1(d) is a graphical representation of a time-frequency distribution of the artificial test signal, where the representation is generated by a Wigner Distribution.

The Wigner Distribution, however, suffers from shortcomings, including lack of positivity (i.e., positive energy distribution) and the appearance of distorting artifacts for signals other than a single chirp. For example, referring to FIG. 1(d), the Wigner distribution 16 of the same artificial test signal used in FIGS. 1(a) through 1(c) is shown. As shown in FIG. 1(d), although the joint-time frequency resolution is good, very strong distorting artifacts are present in the Wigner distribution which make accurate signal interpretation virtually impossible.

What is needed therefore is a speech recognition apparatus and method for generating time-frequency distributions of speech signals to be analyzed which has high resolutions in time and frequency at all angular orientations, a positive energy distribution and minimal distortion or interference between components in different time-frequency regions.

SUMMARY OF THE INVENTION

The preceding and other shortcomings of prior art are addressed and overcome by the present invention which provides a speech recognition apparatus and method for combining multiple spectrograms with varying window lengths and orientations to provide a parameter-less time-frequency distribution having good joint time and frequency resolution at all angular orientations. The analysis window of a spectrogram is rotated relative to the frequency components of the signal by preprocessing using a Fractional Fourier Transform to form rotated window spectrograms. To form the rotated window spectrogram, the signal is initially pre-processed using a Fractional Fourier Transform of angle α, the spectrogram time-frequency distribution of the pre-processed signal is then computed using analysis window h(t) and then rotated back by angle −α. The geometric mean of a set of rotated window spectrograms, which are indexed by both the analysis window length and the angular orientation of the window relative to the signal's time-frequency features, is then computed to form a combination of rotated window spectrograms.

In particular, the present invention provides, in a first aspect, a speech processing apparatus for generating a time-frequency distribution of a speech signal to be analyzed, including a source for generating a plurality of digital signal samples respresentative of the speech signal and a processor means coupled to the source. The processor means includes means for transforming the plurality of signal samples to pre-processed signals representative of the frequency domain at various angular orientations, a spectrogram for generating initial time-frequency distributions of the pre-processed signals using analysis windows, means for rotating the analysis windows back by the various angular orientations for generating a plurality of rotated window spectrograms, and means for combining the rotated window spectrograms to form a parameter-less combined rotated window spectrogram.

The present invention provides, in another aspect, a speech processing method for generating a time-frequency distribution of a speech signal to be analyzed, including the steps of capturing a plurality of digital signals representative of the speech signal and processing the digital signals. The step of processing the digital signals includes transforming the plurality of signal samples to pre-processed signals representative of the frequency domain at various angular orientations, generating initial time-frequency distributions of the pre-processed signals using analysis windows, rotating the analysis windows back by the various angular orientations for generating a plurality of rotated window spectrograms, and combining the plurality of rotated window spectrograms to form a parameter-less combined rotated window spectrogram.

The foregoing and additional features and advantages of this invention will become apparent from the detailed description and accompanying drawing figures that follow. In the figures and the written description, numerals indicate the various features of the invention, like numerals referring to like features throughout for both the drawing figures and the written description.

DETAILED DESCRIPTION OF THE PREFERRED EMBODIMENTS

Figure 2:
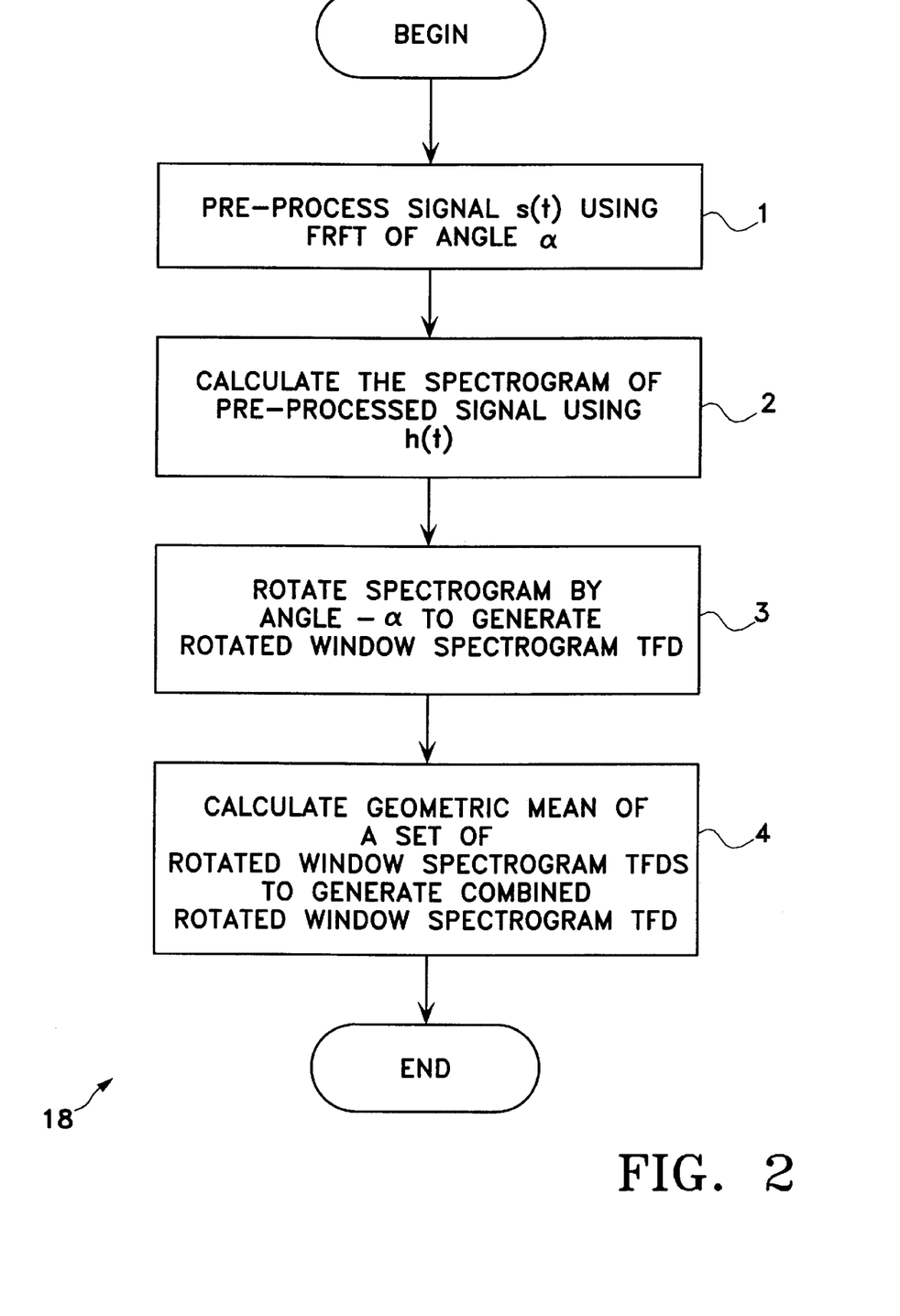
FIG. 2 is a flowchart representative of an algorithm for computing the time-frequency distribution of a signal using a combination of rotated window spectrograms in accordance with the present invention.

Referring to FIG. 2, there is shown generally a flowchart 18 representative of an algorithm for computing the time-frequency distribution of the signal s(t) using a combination of rotated window spectrograms in accordance with the present invention. The present invention provides a speech processing and analysis apparatus and method for mapping a time-frequency distribution of a speech signal by combining a set of spectrograms with varying window lengths and orientations to provide a parameter-less time-frequency distribution having good joint time and frequency resolution at all angular orientations. As will be further noted and hereinafter more fully described, the analysis window of a spectrogram is rotated relative to the frequency components of the signal by preprocessing using a Fractional Fourier Transform to form rotated window spectrograms. In particular, to form the rotated window spectrogram, the signal is initially pre-processed using a Fractional Fourier Transform of angle α, the spectrogram time-frequency distribution of the pre-processed signal is then computed using analysis window h(t) and then rotated by angle −α. The geometric mean of a set of rotated window spectrograms, which are indexed by both the analysis window length and the angular orientation of the window relative to the signal's time-frequency features, is then computed to form a combination of rotated window spectrograms.

The present invention will be described in the context of a time-varying speech signal representative of spoken words and phrases. One skilled in the art will recognize that the present invention is not limited however to speech recognition. Rather, the present invention may be adapted to provide accurate representation of the time-frequency distribution of a signal in other signal processing applications where it is desired to monitor the frequency components of a signal, particularly a non-stationary signal, with respect to time. These other applications include but are not limited to speaker verification, rotating machinery diagnostics, sonar and radar processing.

Typically, the signal s(t) to be analyzed is a time-varying signal having energy or intensity values as a function of time. The continuous analog input signal s(t) may be initially converted by an analog-to-digital converter (shown in FIG. 5) or other similar device into a discrete signal comprised of thousands or millions of discrete energy or intensity values, thus allowing the signal to be processed by a digital computer.

Typically, a speech signal converted to digital form includes at least 256 discrete values each 0.1 msec. Signal s(t) comprises a set of time frames, with each time frame covering 0.1 msec of the signal. Alternatively, the present invention can be implemented solely in analog form, with appropriate electrical circuits provided for manipulating and processing analog signals.

Referring to FIG. 2, a flowchart 18 representative of an algorithm for computing the time-frequency distribution of the signal s(t) using a combination of rotated window spectrograms in accordance with the present invention is illustrated. The signal s(t) is initially pre-processed using the Fractional Fourier Transform of angle α, where α is equal to the angular orientation of the window relative to the signal's time frequency features (step 1).

The spectrogram time-frequency distribution of the pre-processed signal is then computed using analysis window h(t) and then rotated back by angle −α (step 2). The geometric mean of a set of rotated window spectrograms, which are indexed by both the analysis window length and the angular orientation of the window relative to the signal's time-frequency features, is then computed to form a combination of rotated window spectrograms.

Figure 3:
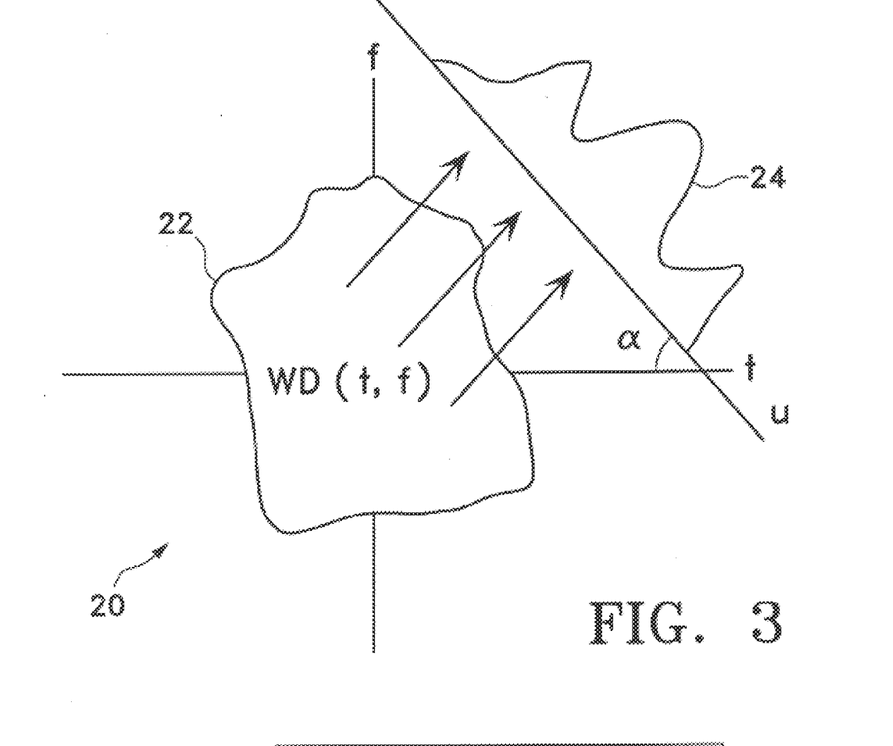
FIG. 3 is schematic representation showing that the magnitude-squared of the Fractional Fourier Transform of a signal at angle α is given by the projection of the Wigner Distribution along angle α in accordance with the present invention.

In particular, referring to step 1, the signal s(t) is pre-processed using the Fractional Fourier Transform. The Fractional Fourier Transform is described in L. B. Almeida, "The Fractional Fourier Transform and Time-Frequency Representations," IEEE Transactions on Signal Processing, Vol. 42, No. 11, pgs. 3084–3091 (November, 1994) and A. W. Lohmann and B. H. Soffer, "Relationships Between the Radon-Wigner and Fractional Fourier Transforms," Journal of the Optical Society of America A, Vol. 11, No. 6, pgs. 1798–1801 (June 1994), the disclosure of both of which is hereby incorporated herein by reference. In accordance with the present invention, it is recognized that the Wigner Distribution of a signal, generated in accordance with Eq. (2) as previously stated, transformed by the Fractional Fourier Transform of angle α is equal to the Wigner Distribution of the original signal, rotated by α. The Fractional Fourier Transform thus induces a simple rotation of the Wigner Distribution (i.e., a rotation of the axis along which the signal is represented). In particular, referring to FIG. 3, a graph 20 of the Wigner Distribution WD(t,f) 22 projected along an angle α in a time-frequency plane is illustrated. The projections of the Wigner Distribution are called generalized marginals. A projection of the Wigner Distribution WD(t,f) along an angle α is equal to the magnitude-squared of the Fractional Fourier Transform of the signal 24 for that α (step 5) as defined by Eq. (3) as follows:

$$|FRFT_\alpha(u)|^2 \qquad (3)$$

where $$FRFT_\alpha(u) = \int s(t) K_\alpha(t,u)\, dt_\alpha(t,u) = \qquad (4)$$

$$\sqrt{((1 - j\cot\alpha)/2\pi)} \; \exp[j((t^2 + u^2)/2)\cot\alpha - jtu\csc\alpha]$$

In accordance with an advantage of the present invention, by combining the above two properties, it follows that the true time-frequency components of the signal s(t) are rotated in the time and frequency plane by the Fractional Fourier Transform, defined in Eq.(4). Thus, the Fractional Fourier Transform can be used to rotate the time-frequency components of a signal until they match the optimum 0 and π/2 angles for the spectrogram. The Fractional Fourier Transform is a generalization of the conventional Fourier transform to transforms intermediate between the identity operator and the Fourier transform. For example, when α=π/2, the Fractional Fourier Transform coincides with the conventional Fourier transform. When α=0, the Fractional Fourier Transform is the identity operator. As the angle parameter a varies between 0 and π/2, the basis function of the decomposition in Eq.(4) varies from delta functions to chirps to sinusoids. Intermediate values of α result in transforms with mixed time-frequency information.

The Fractional Fourier Transform is preferably digitally implemented using commercially available circuitry. One skilled in the art will recognize that the Fractional Fourier Transform could be implemented in an analog or digital form. In particular, in the analog form, one skilled in the art will recognize that the Fractional Fourier Transform could be implemented optically.

Referring to step 2 of FIG. 2, the spectrogram of the preprocessed signal is calculated. The pre-processed signal is divided into a set of individual signals, each representing a portion or window of the original signal and a time-frequency distribution of the pre-processed signal is generated. Once divided into a set of individual signals, each time-varying signal is transformed from the time domain into the frequency domain. Transformation into the frequency domain is achieved by computing the Fourier Transform by conventional means such as a fast Fourier transform or the like. In the preferred embodiment, a spectrogram using a sliding-window h(t) Fast Fourier Transform analysis is preferably used to produce the time-frequency distribution of the pre-processed signal in accordance with previously stated Eq. (1). The window is preferably defined by a sliding Hamming window function, although other conventional window functions known in the art, such as rectangular, Bartlett, Hanning and Blackman may be used as well. The duration, shape, and time shift step size of the windows are configurable parameters of the system which may be adjusted appropriately to achieve desired results.

The time-frequency distribution generated by the spectrogram of the pre-processed signal s(t) is then rotated by angle $-\alpha$, where $\alpha$ is equal to the angular orientation of the window relative to the signal's time frequency features (step 3). Although a spectrogram time-frequency distribution of the preprocessed signal is preferably generated, it will be understood by those skilled in the art that other time-frequency distributions and/or window functions may be used in the present invention, particularly when advanced processing capability arises.

Thus, in accordance with the present invention, the analysis window of a conventional spectrogram is effectively rotated relative to the frequency components of the signal by preprocessing using the Fractional Fourier Transform resulting in a time-frequency distribution generated by a Rotated Window Spectrogram. In the resultant Rotated Window Spectrogram transform, resolution trade-offs occur along angles $\alpha$ and $\alpha+\pi/2$, instead of along 0 and $\pi/2$ as in the conventional spectrogram. In accordance with an advantage of the present invention, this additional flexibility allows higher accuracy time-frequency analysis, especially if several Rotated Window Spectrogram transforms with different angles are combined, as discussed in detail below.

Multiple rotated window spectrograms of the same signal, each with a different window length and angular orientation may thus be computed, and combined into a single time-frequency distribution as described in detail below.

Referring to step 4 of FIG. 2, the geometric mean of a set of rotated window spectrogram time-frequency distributions is computed to generate a combination of rotated window spectrograms. In accordance with the present invention, the geometric mean of a set of Rotated Window Spectrogram transforms, indexed by both the analysis window length and the angular orientation of the window relative to the signal's time-frequency features are formed. Indexing can either be tailored to the signal, or a parameter-less distribution can be formed by increasing the number and range of the window lengths and orientations until the distribution becomes independent of the indices, e.g. the distribution is unaffected by further increases in the indices.

The geometric mean of short and long window rotated window spectrogram transforms of angle $\alpha$ results in good joint time and frequency resolution for signals, particularly non-stationary signals such as chirps, of angle $\alpha$. In accordance with the present invention, a time-frequency distribution generated by combining the rotated window spectrograms is thus formed. The combined rotated window spectrograms may be computed in accordance with Eq.(5) as follows:

$$\text{Combined rotated window spectrograms}(t,f) = \left[ \prod_\alpha \prod_h \text{ROWS}_{\alpha,h}(t,f) \right]^{1/N} \quad (2)$$

$\alpha$=angular orientation of the window relative to the signal's time frequency features
h=window length
N=total number of rotated window spectrograms being combined.

By selecting a large enough range of a and h, the combined rotated window spectrograms (t,f) become a parameter-free time-frequency distribution which does not need to be tuned to the signal, has excellent joint time-frequency resolution, is purely positive, satisfies the generalized marginals in all directions, not just 0 and $\pi/2$ as is the case for combinations of conventional spectrograms, and does not introduce distorting artifacts.

One skilled in the art will recognize that the applicable considerations of the present invention apply equally well to signal processing applications where all that is desired is to provide rotated window spectrograms of a signal, i.e. combining a plurality of rotating window spectrograms is not a necessary step.

In accordance with the present invention, some aspects of the present invention may be processed parallel or independently to increase the speed at which data is processed and time-frequency distributions are displayed. For example, the individual rotated window spectrogram transforms can be processed independently.

Figure 4:
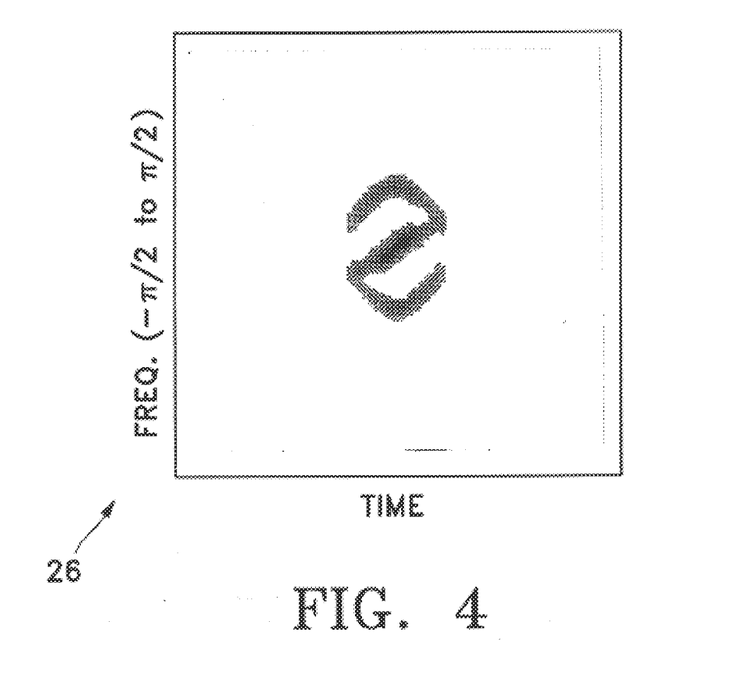
FIG. 4 is a graphical representation of a time-frequency distribution of the artificial test signal, where the representation is generated in accordance with the present invention.

An example of an implementation of the combined rotated window spectrograms transform is illustrated in FIG. 4 using the same artificial test signal as in FIGS. 1(*a*) through 1(*d*) i.e. a signal consisting of a short linear chirp and two 512-point complex exponential components whose center frequencies trace an approximately circular path in the time-frequency plane. As is illustrated in FIG. 4, the combined rotated window spectrogram time-frequency distribution 26 approximates an accurate time-frequency distribution (where the horizontal axis is time, the vertical axis is frequency, with a frequency range of [$-v/2$, $v/2$] where v is the Nyquist rate). For each window orientation, 64 windows with lengths ranging from 8 to 256 were used. In addition, 20 window orientations evenly spaced between 0 and $\pi$ were used. The number of windows and orientations was large enough in this example for the distribution to be parameter-less, as discussed above.

Figure 5:
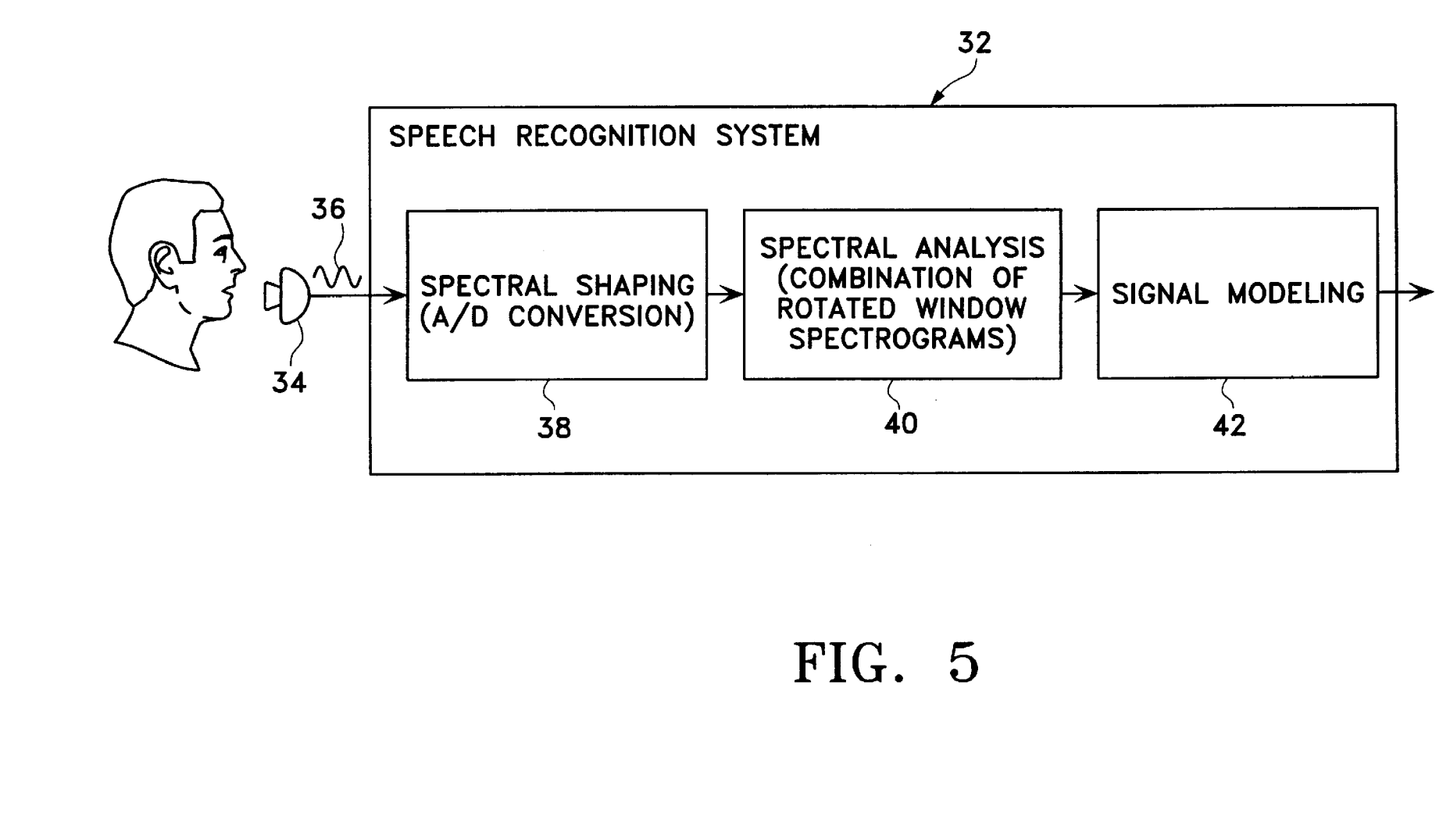
FIG. 5 is a block diagram of a speech recognition system including the combined rotated window spectrograms of the present invention.

FIG. 5 is a block diagram of a speech recognition system 32 using the combination of rotated window spectrograms to compute the time frequency distribution of a signal in accordance with the present invention. In operation, the utterance of a word is initially received from a device, such as a microphone 34, which in response to sound waves generates an electric current. As shown in FIG. 5, the utterance of the word "basket" is initially received from a microphone 34 in the system 32 and an electrical representation of the acoustic signal is generated. The system 32 receives the signal as an analog waveform 36 which corresponds to the variation in air pressure over time associated with the sound of a spoken word. The continuous analog input signal s(t) is converted by an analog-to-digital converter 38 or other similar device into a discrete signal comprised of thousands or millions of discrete energy or intensity values, thus allowing the signal to be processed by a digital computer. The analog-to-digital converter 38 thus converts the amplitude of the acoustic signal into a corresponding digital value at each of a succession of evenly spaced points in time. Commonly, such sampling is performed 8000 times per second for speech recognition.

The time-frequency distribution of the signal is then computed using the combined rotated window spectrogram 40 of the present invention. In particular, the analysis window of a spectrogram is rotated relative to the frequency components of the signal by preprocessing using a Fractional Fourier Transform to form rotated window spectrograms. To form the rotated window spectrogram, the signal is initially pre-processed using a Fractional Fourier Transform of angle α, the spectrogram time-frequency distribution of the pre-processed signal is then computed using analysis window h(t) and then rotated back by angle −α. The geometric mean of a set of rotated window spectrograms, which are indexed by both the analysis window length and the angular orientation of the window relative to the signal's time-frequency features, is then computed to form a combination of rotated window spectrograms.

Figure 6:
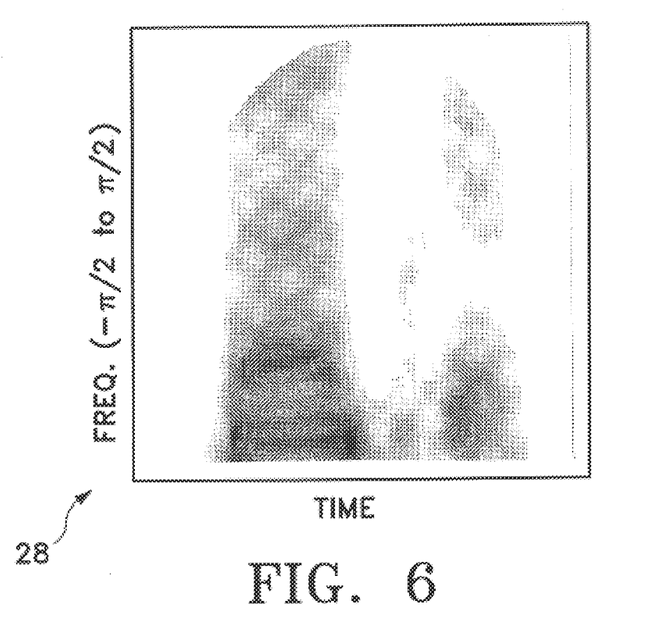
FIG. 6 is a graphical representation of a time-frequency distribution of a speech signal corresponding to the spoken word "basket", where the representation is generated in accordance with the present invention.

Referring to FIG. 6, the combined rotated window spectrogram 28 using the speech signal corresponding to the spoken word "basket" is illustrated. The sampling rate was 8 Khz and the signal length was 4096 points. As is illustrated in FIG. 6, the combined rotated window spectrogram time-frequency distribution of the present invention approximates an accurate time-frequency distribution (where the horizontal axis is time, the vertical axis is frequency, with a frequency range of [−v/2, v/2] where v is the Nyquist rate). In operation, 20 window orientations were averaged in Eq. (5) and the window length was kept fixed at 512. The present invention thus maintains good resolution in both time and frequency and is able to resolve rapid variations in speech formants.

The combined rotated window spectrogram is then typically utilized in a signal modeling apparatus 42 as shown in FIG. 5. For example, the combined rotated window spectrogram provides a vector, that is an ordered succession or variables, which represents the intensities at different frequency ranges. Once a series of vectors is produced for each utterance, the series is matched against each of a plurality of word models to find which of them it most closely matches.

Figure 7:
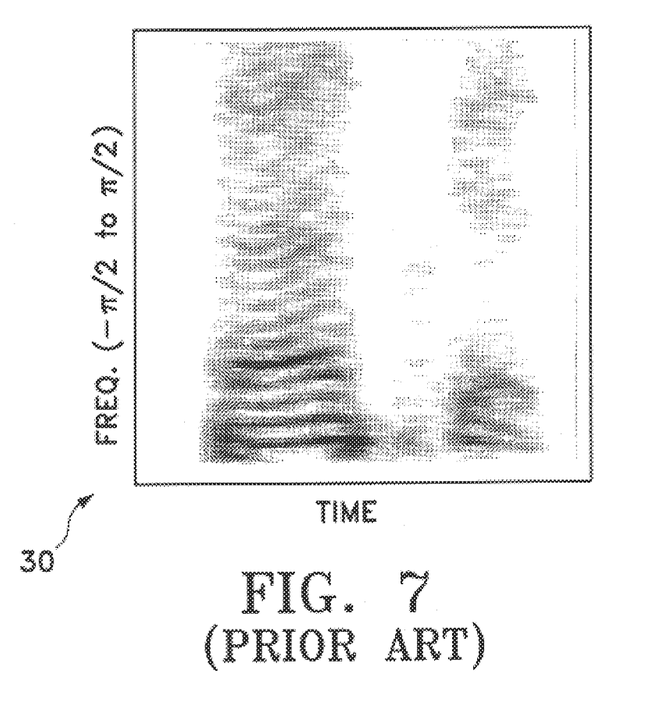
FIG. 7 is a graphical representation of a time-frequency distribution of a speech signal corresponding to the spoken word "basket", where the representation is generated by a conventional spectrogram.

In contrast, referring to FIG. 7, the conventional spectrogram 30 is smeared in the time dimension and cannot resolve the formant variations for the same speech signal. The window length used was 512 and the window was shifted by 16 points for each time step in the spectrogram.

One skilled in the art will appreciate that the combined rotated window spectrogram of the present invention may be adapted to be displayed on a CRT, printer, or any other device which displays the time-frequency distribution of the signal. Additionally, it will be recognized by one skilled in the art that the system and method of the present invention is not limited to forming displays of time-frequency distributions, but rather may be adapted to be displayed in the manner required.

It, of course, will be appreciated by those skilled in the art that many modifications and variations may be made in what has been specifically described without departing from the scope or spirit of the invention. By way of example, the applicable considerations apply equally well to signal processing applications not described herein. These other forms, as indicated, are merely exemplary. Accordingly, the scope of the invention shall not be referenced to the disclosed embodiments, but on the contrary, shall be determined in accordance with the claims that follow.

What is claimed is:

1. A speech recognition apparatus, comprising:
   a spectral shaping source for generating a plurality of digital signal samples representative of an input speech signal;
   a signal processor coupled to said source, comprising:
      means for transforming said plurality of said signal samples to pre-processed signals representative of the frequency domain at various angular orientations;
      means for generating initial time-frequency distributions of said pre-processed signals using analysis windows; and
      means for rotating said time-frequency distributions back by said various angular orientations for generating a plurality of rotated window spectrograms, and
   signal modeling apparatus for comparing the plurality of rotated window spectrograms against each of a plurality of word models and identifying the closest match.

2. The apparatus claimed in claim 1, wherein said processor means, further comprises:
   means for combining said plurality of rotated window spectrograms to form a parameter-less combined rotated window spectrogram.

3. The apparatus claimed in claim 2, wherein said means for transforming said plurality of said signal samples to pre-processed signals representative of the frequency domain at various angular orientations, further comprises:
   Fractional Fourier transform means for generating pre-processed signals representative of the frequency domain at various angular orientations.

4. The apparatus claimed in claim 3, wherein said Fractional Fourier transform means for generating pre-processed signals representative of the frequency domain at various angular orientations, further comprises:
   means for pre-processing using the Fractional Fourier transform of an angle equal to the angular orientation of the window relative to said signal's time-frequency characteristics.

5. The apparatus claimed in claim 4, wherein said means for generating initial time-frequency distributions of said pre-processed signals using analysis windows, further comprises:
   spectrogram means for generating time-frequency distributions of said pre-processed signals.

6. The apparatus claimed in claim 5, wherein said means for combining said plurality of rotated window spectrograms to form a parameter-less combined rotated window spectrogram, further comprises:
   means for computing a geometric mean of said plurality of rotated window spectrograms.

7. The apparatus claimed in claim 6, wherein said means for computing a geometric mean of said plurality of rotated window spectrograms, further comprises:
   means for indexing the analysis window length and angular orientation of said plurality of rotated window spectrograms relative to time and frequency.

8. The apparatus claimed in claim 7, wherein said Fractional Fourier Transform means rotates the time-frequency components of said signal samples until they match 0 and π/2.

9. The apparatus claimed in claim 8, wherein said source for generating a plurality of digital signal samples representative of said signal, further comprises:
   convertor means for digitally converting said signal.

10. The apparatus claimed in claim 9, wherein said apparatus is utililized for speech processing.

11. The apparatus claimed in claim 10, further comprising:
   signal modeling means for generating word models in response to said combined rotated window spectrograms.

12. The apparatus claimed in claim 11, wherein said speech processing includes speech recognition.

13. The apparatus claimed in claim 11, wherein said speech processing includes includes speaker verification.

14. The apparatus claimed in claim 9, wherein said signal is a diagnostic signal.

15. The apparatus claimed in claim 9, wherein said signal is a sonar signal.

16. The apparatus claimed in claim 9, wherein said signal is a radar signal.

17. A speech recognition method, comprising the steps of:

capturing a plurality of digital signal samples representative of an input speech signal;

generating a plurality of rotated window spectrograms from said signal samples, comprising the steps of:

transforming said plurality of said signal samples to pre-processed signals representative of the frequency domain at various angular orientations using Fractional Fourier Transform means;

generating initial time-frequency distributions of said pre-processed signals using analysis windows; and rotating said time-frequency distributions back by said various angular orientations, and generating word models in response to said plurality of rotated window spectrograms.

18. The method claimed in claim 17, wherein said step of generating a plurality of rotated window spectrograms further comprises the step of:

combining said plurality of rotated window spectrograms to form a parameter-less combined rotated window spectrogram.

19. The method claimed in claim 18, wherein said step of transforming comprises:

pre-processing using the Fractional Fourier Transform of an angle equal to the angular orientation of the window relative to the time-frequency characteristics of said signal samples.

20. The method claimed in claim 19, wherein said step of generating initial time-frequency distributions of said pre-processed signals using analysis windows, further comprises the step of:

generating time-frequency distributions of said pre-processed signals using spectrogram means.

21. The method claimed in claim 20, wherein said step of combining said plurality of rotated window spectrograms to form a parameter-less combined rotated window spectrogram, further comprises the step of:

computing a geometric mean of said plurality of rotated window spectrograms.

22. The method claimed in claim 21, wherein said step of computing a geometric mean of said plurality of rotated window spectrograms, further comprises the step of:

indexing the analysis window length and angular orientation of said plurality of rotated window spectrograms relative to time and frequency.

23. The method claimed in claim 22, wherein said step of transforming, further comprises the step of:

rotating the time-frequency components of said signal samples until they match 0 and $\pi/2$ angles.

24. The method claimed in claim 23, wherein said step of capturing a plurality of digital signal samples representative of said input speech signal, further comprises the step of:

digitally converting said input speech signal.

25. The method claimed in claim 24, wherein said signal is a diagnostic signal.

26. The method claimed in claim 24, wherein said signal is a sonar signal.

27. The method claimed in claim 24, wherein said signal is a radar signal.

28. The method claimed in claim 19, wherein said step of generating word models comprises generating word models in response to said combined rotated window spectrograms.

29. The method claimed in claim 28, further comprising the step of comparing said word models generated in response to said combined rotated window spectrograms against each of a plurality of word models to identify the closest match.

30. The method claimed in claim 29, further including a step of speaker verification using the word model identified as the closest match.

* * * * *